Jan. 4, 1966 G. R. BELL 3,227,650
TURBIDITY AND COLOR REMOVAL BY FILTER AID FILTERS
Filed April 3, 1963
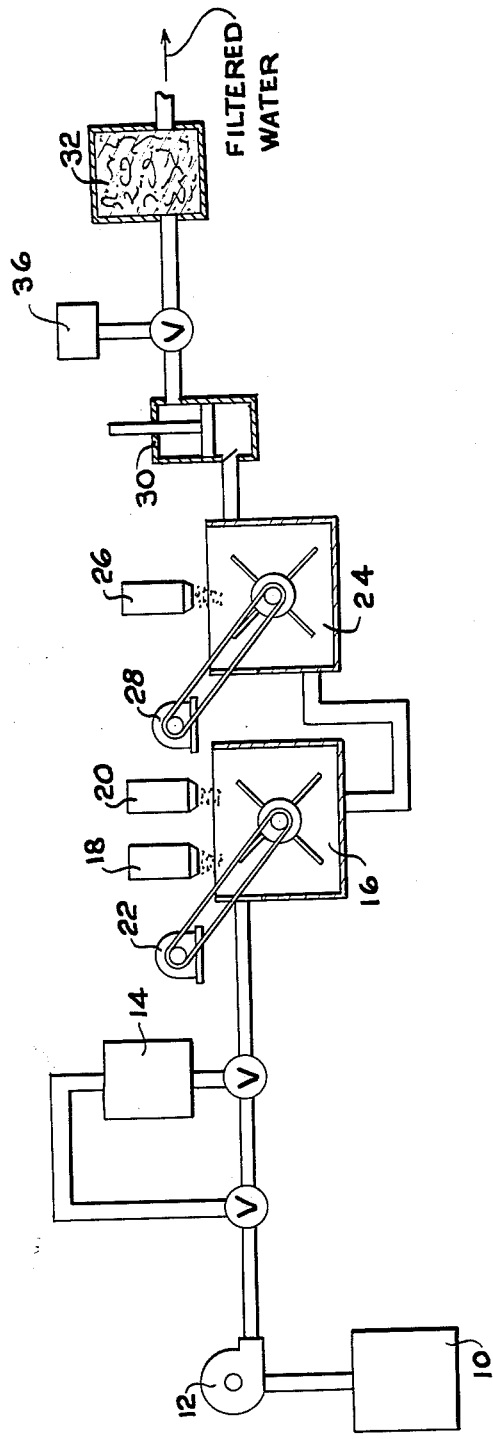
INVENTOR.
GEORGE R. BELL
BY
ATTORNEY

3,227,650
TURBIDITY AND COLOR REMOVAL BY FILTER AID FILTERS
George R. Bell, Martinsville, N.J., assignor to Johns-Manville Corporation, New York, N.Y., a corporation of New York
Filed Apr. 3, 1963, Ser. No. 270,423
7 Claims. (Cl. 210—53)

This invention relates to an improved method for removing colloidal and/or finely divided insoluble materials from liquid, and especially concerns the removal of organic color matter and finely divided turbidity from water supplies and waste water streams. More particularly, this invention relates to the filtration, clarification and purification of water to remove impurities therefrom and to the novel method to effect the same. Still more specifically, this invention relates to a method of filtration with filter aids which includes a preconditioning step to reduce the suspensoids to a clarifiable condition and to render them filterable by attachment to rigid filter aid particles.

As generally understood, filtration is the removal of suspended particles from a liquid by forcing the liquid under a pressure differential through a filter medium. Slow sand filters were the first water filter structures devised to accomplish this on a large scale and in many ways simulated percolation through naturally occurring sand such as that of the banks or galleries along the edges of rivers or other water sources. These structures, however, have several disadvantages including such low capacity that large areas and expensive construction were required, and, more significantly, the inability to handle many types of contamination found in water supplies.

As the technology advanced, much coarser sand was employed acting largely as straining devices, and these have been termed "rapid sand filters." An important aspect of this technique is that these filters have little inherent clarifying capacity in themselves and the clarification must be provided by prior treatment of the water with appropriate chemicals and processes. That is, the suspended matter therein are treated to collect or coalesce into sufficiently large agglomerates so as to settle out and be substantially removed in advance of the rapid sand filter. This preparatory process which cause coalescence as thus described is called "pretreatment" among water works engineers and operators. Such a process characteristically includes an array of equipment such as chemical feeders, flash mixing basins, slow mixing chambers in which the agglomerates form, sedimentation basins to remove the agglomerates and finally the filters themselves, which take out the larger sized contaminants. The material thus entrapped in the sand, is considered by some to lend itself to the clarification mechanism of the sand filter, but almost never is unpretreated water filtered through rapid sand filters if high quality filtered water is desired. It is commonly understood in water works practice that the term "sand filter plant" includes the pretreatment works which are substantially larger and more expensive than the sand filter structures themselves. This technique is more fully explained in "Betz Handbook of Industrial Water Conditioning."

Because the size and cost of the foregoing processes make them unobtainable to most water users, smaller communities and industries have had certain difficulties associated with their water supplies. Of the many impurities thus encountered, among the most prominent and most trouble-causing have been turbidity and color.

Turbidity may be defined as the lack of clearness in water but should not be confused with color, for water may be dark in color but nevertheless clear and not turbid. This lack of clearness is primarily due to suspended matter in a finely divided state and may be the result of silt, organic matter, microscopic organisms and similar materials. Consequently, turbidity is the measurement of the optical obstruction of light passing through the water caused by the suspended particles and is not based on any weight concentration. Color of water on the other hand is exactly what the word means—the light characteristics of water as determined by visual observation, and generally, is imparted to water by the presence of complex organic bodies colloidal in nature or possibly in true solution.

Recently, innovations have been put forth purporting to improve rapid sand filter color and turbidity removal performances when in reality they are improvements to the pretreatment process which precedes the actual filter operation. The reason for this becomes apparent when it is understood that any appreciable amount of residue not removed by settling from the filter influent will quickly tend to clog the filter, producing impractical head losses in a relatively short time.

Specifically, approaches have been made by various individuals which concentrate on producing the floc or coagulant of the material to be removed by the addition of a flocculating agent or coagulation aid. Such agents may be represented by the high molecular weight polyacrylamides and are used as additaments to the aqueous medium. Representative of such materials and similar agents are those disclosed in U.S. Letters Patents Nos. 2,831,841 and 2,909,508 to Jones and 2,995,512 to Weidner et al.

Further endeavors, as illustrated by U.S. Patents Nos. 2,817,645 to Weisgerber and 2,862,880 to Clemens, approach the problem on the basis that the turbidity may be classified as negatively charged particles. Accordingly, it was devised that the water be treated with an inorganic coagulating solution of a positive charge, such as aluminum sulfate in combination with the flocculating agent, e.g., polyamide compound, whereby the advantages of both could be utilized.

However, even these processes, while they permit the removal of a goodly portion of the suspended particles by more rapid sedimentation, have had particular disadvantages in that they must combine the techniques of both filtration and sedimentation. Filtration itself is not sufficient, for while the coagulated larger particles can be filtered without sacrificing filtration speed, the flexible gel-like masses of the floc with enmeshed suspended particles soon clog or gum-up the filter, necessitating frequent undesirable and uneconomical shut downs. Further, in many cases the use of the sedimentation process with its accompanying need for expensive apparatus and extended cycles has increased the cost of the process beyond permissible limits.

One other practice merits notation and involves the addition of small amounts of coagulant aid and alum to relatively clear raw water supplies, thorough mixing, and then filtration, without either forming a discrete floc or settling, on relatively coarse rapid sand filters containing an upper layer of anthracite. It is postulated that the grains of the filter medium, sand and/or anthracite, become coated and that the coated surfaces thus activated cause the clarification.

Thus, this portion of the prior art to date, has dealt primarily with improvements to the floc formation and sedimentation steps, to reduce the load on the filters and also to permit more open, larger grained, sand and higher filtration rates as a means of reducing costs.

While the above sums up that which might be termed the traditional approach to water filtration, technologies long used by other industries are presently being adapted to water clarification. Specifically, the principle of filter air filtration which has long demonstrated many advantages in other fields has shown significant economic and technological advances in water clarification.

It is important to understand that these economies result from the simplicity of the process whereby the requirements for large and expensive structures to provide for long floc formation and settling periods are reduced.

As noted above, filtration theory calls for the liquid filtrate to pass through the openings of a filter medium, which may be a septum of cloth, screen, etc., while the suspended particles are to remain behind. However, in reality, the finer suspended particles also pass with the liquid as the coarse openings of the medium are unable to retain them, while the larger particles do become filtered and remain upon the medium, soon to clog the openings and eventually slow down or completely stop the flow of liquid through the filter.

These difficulties have been for the most part overcome by adding a small amount of filter aid to the liquid to be filtered. By so doing, the filter aid functions to form continuously a porous cake upon the filtering surface and in actuality to entrap impurities by various mechanisms, such as by surrounding each particle of slimy, gummy, squashy or compressible solid to prevent the blinding over of the filter surface. The properties of the filter aid, e.g., porosity, fineness, diversity of shape, incompressibility, etc., make it unique for this purpose. A particularly important feature of filter aid filtration is that the pores in the surface of the filter aid cake are far smaller than those in the filter medium, thereby enabling the removal of some very substantial proportion of the suspended particles. The portion removed will, of course, be a function of the size and nature of the particles to be filtered and the porosity and inherent clarifying ability of the particular filter aid. This technique is to be distinguished from the pretreatment bed filtration as all of the liquid with its suspended solids is introduced into the filter.

In order to increase the initial efficiency of the filter aid filtering process, a precoat of filter aid particles is provided on the filter septum in addition to the incorporation of particles within the liquid. This keeps the main filter cake containing the impurities from coming into direct contact with the filter medium and consequently prevents the gummy particles from clogging the medium and lessening the filtration efficiency in the manner mentioned above.

The materials most generally used as filter aids are diatomaceous silica, perlite, other siliceous materials, carbon, and fibrous matter such as asbestos and cellulose. However, even with the use of filter aids, some difficulty remains due to the fact that too frequently water supplies or waste water streams contain materials too finely divided or color ingredients which are too difficult to remove by the use of practical grades of filter aids having a porosity great enough to obtain an economical filtration rate.

To retrace briefly the early efforts made in this area, initial attempts proceeded along the same theory as advocated by Weisgerber and Clemens regarding the electric charge of the contaminants. Such may be evidenced by the Frankenhoff U.S. Letters Patent Nos. 2,468,188 and 2,468,189. The substance of this technique was a method requiring the substantially simultaneous addition to the water of the filter aid and a floc former in the form of water-soluble salts of particular trivalent metals. Utilizing prescribed limits, the salt was to be converted to a hydrate state solely through the effects of the natural alkalinity of the water medium, and it was thought that it becomes coated upon the filter aid particles. All too frequently the above processes have not worked satisfactorily, either because of incomplete precipitation of the metallic hydrate with consequential contamination of the filtered product, or because of high rates of head loss increase resulting in filter cycles so short as to be economically and operationally impractical. Consequently, very little advance has been made in the filter aid filtration of water, as a result of these techniques.

More recently, it has now been found that, contrary to the previous teachings, and perhaps the reasons for the failure of the early attempt, the coating may be effected upon a filter aid surface only if, prior to effecting the formation of the hydroxide through the proper chemical reaction, the filter aid particles to be coated are first placed in suspension in such amounts so as to constitute at least 0.25 percent by weight in the medium and thereafter effect the precipitation to obtain the coated filter aid. That is, only with filter aid concentrations of 0.25 percent by weight or more, will a coating be insured upon the filter aid. Once the coating has been formed, the concentration may be appropriately reduced to as little as 0.001 percent or less without any loss of effectiveness. U.S. Letters Patent application Serial No. 118,276 filed June 20, 1961, assigned to the instant assignee illustrates this process.

It is known in water purification practice that the trivalent metal hydrates, for example, have their greatest coalescing or collecting power at the time of precipitation prior to actual "floc" formation. The floc particles after formation have been shown to have substantial activity, which is indeed the source of the activity of the coated filter aids prepared in accordance with the aforesaid pending application. However, for some types of applications or where very high concentrations of contaminants are encountered the highest levels of activity may be required to produce adequate removal. Indeed, enhancement of the activity of floc formers and improved settling characteristics of the floc are objectives of use of polyelectrolytes in the aforementioned prior art concerned with improvements to sand filtration practice. It has now been discovered that these same levels of activity may be efficaciously used in conjunction with subsequent filter aid filtration in which no settling step is required.

Specifically, it has been determined that substantial and economical turbidity removal may be achieved by employing a new technique of treating the water to enable utilization of filter aid filtration. Briefly, the water is prepared by first introducing a floc forming material under conditions to form the floc typically characterized by non-rigidness; adding a filter aid, and thereafter incorporating a cationic branch chain polyelectrolyte. The latter ingredient causes the floc to affix itself on the filter aid thereby imparting rigidity and better filtration characteristics to the floc. The floc contains the turbidity and color as inclusions therein. The resultant coated filter aid can then be removed by any filter aid filter technique.

It is important to note here that this water is directly passed to the filter without necessitating the use of substantial detention or any settling steps, such as those associated with pretreatment or sand filters. The amount of turbidity and color in the filtered water may be reduced to 5 A.P.H.A. silica units and 15 p.p.m. on the platinum-cobalt scale, or much lower, respectively, which equals or is better than the currently recommended standards of the U.S. Public Health Service, and many other objectionable impurities, such as emulsified oil, starch suspensions, finely divided oxides or hydroxides, may be effectively removed, all with economical and efficient head loss rates.

OBJECTS

It was accordingly a principal object of this invention to provide a more practical means whereby the deficiencies of the foregoing filter aid filtration processes were overcome.

It was a further object of this invention to provide a method for clarifying and substantially purifying water supplies wherein maximum effectiveness is achieved as to the removal of turbidity, color and other impurities.

It was another object of this invention to provide a new and novel and more practical method of introducing the necessary ingredients into waste water or water supplies to be treated so as to increase the effectiveness of the additives with regard to the clarification and purification of the water supplies by the removal of impurities therefrom.

It was another object of this invention to provide a practical means of purifying contaminated water sources to render them potable.

Additional objects and further scope of applicability of the present invention will become apparent in the detailed description given hereinafter, the preferred embodiment of which has been illustrated in the accompanying drawing by way of example only wherein;

FIGURE 1 is a schematic view of the preconditioning and filtration equipment used in carrying out the instant invention.

DETAILED DESCRIPTION OF THE INVENTION

It has been discovered that the foregoing objects may be satisfied and the above-described disadvantages overcome by providing a new method of treating turbidity or contaminant laden waters. Specifically, it has been devised that the water be treated in the following sequence: Add a floc forming material, e.g., alum, to the water to form a floc characterized by large non-rigid particles and then incorporate a filter aid material. Thus far this process resembles the prior approaches, but it is from this point that it differs from any of the previous techniques. The floc is then caused to affix itself to the filter aid by the addition of a branch chain cationic polyelectrolyte and thereafter the entire suspended matter is removed by simple filtration. Whereas it had previously been thought that the only way to achieve the optimum benefits of the floc former and filter aid was by coating of the filter aid particle utilizing controlled concentraton during the floc forming step, it has now been discovered that the above sequence of steps likewise produce an effective affixation of the floc to the filter aid to impart the desired rigidity thereto.

The floc former may be selected from soluble compounds or salts of trivalent or tetravalent metal such as chromium, thorium, iron or aluminum with the latter two being preferred. It is understood that the selection of the compound is such, as to provide a precipitable product and should be made consistent with the desired results and other facts such as the economics of the process. The hydroxyl compounds are preferred. As with all the ingredients the amount to be used is dependent on the character of the water being treated and of the impurities to be removed. However, between 10 and 400 p.p.m. floc former will generally be adequate with between 20 and 200 p.p.m. being preferred.

The cationic polyelectrolyte as employed herein may be defined as organic substances having reoccurring ionizable groups wherein the cations are chemically linked, and the anions are freely mobile. The group is intended to include among others, the substituted ammonium salts, i.e., including one or more of the characteristic groups primary, secondary (including imines) and tertiary amines, and quaternary ammonium and sulfonium salts and may be represented by those set forth in U.S. Letters Patent Nos. 2,831,841, 2,909,508 and 2,995,152, mentioned above, which disclosures are incorporated herein by reference. One such material found particularly useful is a hydrophilic alkylene polyamine polyfunctional halohydrin polymer resulting from the condensation of an alkylene polyamine and a polyfunctional halohydrin in aqueous solutions to a thickened condition short of gel formation and sold under the trademark of Nalco 600. Another is a branch chain polyelectrolyte containing sulfonium active groups and sold under the trademark Ucar C-149. U.S. Letters Patent Nos. 2,469,683 and 2,543,666 also disclose operable cationic polyelectrolytes and their disclosures are also incorporated herein by reference. Other branch chain cationic polyelectrolytes are known in the art. It has been determined that between 0.001 and 10 p.p.m. of polyelectrolyte will be sufficient for most water treatment with between 0.1 and 3 p.p.m. preferred.

The filter aid used in the body feed may be any one of the commercially available filter aid such as the diatomaceous silica, expanded perlite, or other filter aids or mixtures of the same. The amount of filter aid added is again dictated by the liquid being treated and the desired result, but may be varied between 10 and 400 p.p.m. with between 20 and 200 being preferred.

With continuing reference to the accompanying drawing, this invention may be utilized in the following manner. Water, from a source such as a river, lake, pond or well 10, is drawn from by a centrifugal pump 12 and passed to an aerating tower 14 or alternatively directly into the first of two preconditioning tanks 16. If the water is first passed to the aerating tower it is then directly discharged into the first preconditioning tank. Two feeding devices, 18 and 20, are mounted above the tank 16 and permit the feeding of the floc former and filter aid, respectively. Upon discharge of the floc former into the tank, flocs are formed and filter aid then introduced into the tank. The contents are preferably retained under mild agitation, as by agitator 22. Thereafter, the floc, filter aid and contents are passed to a second precondition tank 24 wherein the polyelectrolyte is introduced from feeder 26, and causes the floc to be affixed to the filter aid. The preconditioned water is then pumped by pump 30 to a commercial filter unit 32, with sufficient pressure to overcome both the resistance of the filter itself and the gradually increasing resistance of the accumulating filter cake. From the filter the water is pumped to end use 34. The filter was also provided with a precoat feeder 36, to supply precoat filter aid to the filter.

A more complete understanding of the invention will become apparent from the following examples of the operation within the scope of the invention.

Example I

To surface water (river) containing 30 p.p.m. turbidity and 100 p.p.m. apparent color was added 50 p.p.m. paper makers alum ($Al_2(SO_4)_3 \cdot 14H_2O$) and an excess of finely ground limestone with rapid agitation to insure solution of the alum and its reaction with the limestone. After 1 minute 100 p.p.m. of high flow rate diatomaceous silica filter aid was added as the rate of agitation was reduced to that level which just kept the filter aid in suspension. Large, discrete floc particles formed almost immediately and floc formation appeared to be substantially complete in 5 minutes. A sample withdrawn at this point showed the floc and filter aid to be separate entities as evidenced by the more rapid settling of the filter aid with its greater specific gravity. Addition of 1 p.p.m. of branch chained polyelectrolyte containing sulfonium active groups and available under the trademark Ucar C-149 to the slowly agitated suspension immediately caused the floc to become affixed to the filter aid, as determined by withdrawing and examining a second sample in which the filter aid and floc settled quickly as a single component. Five minutes after addition of the polyelectrolyte agitation was stopped and the entire liquid was readily filtered on a suction filter. The resultant filtered water was clear to the eye and without visible color.

Example II

The water as in Example I was treated in exactly the same way except that no polyelectrolyte was added. Under these conditions the water was practically unfilterable, although the small amount filtered was clear and colorless.

Example III

The water as in Example I was agitated with filter aid, but without first forming an alum floc, and subsequently filtered as before. The water thus treated filtered readily. However, the filtered water was reduced in turbidity and color content by only about one-half, which would be quite inadequate for potable or industrial uses.

Example IV

The conditions of Example III were repeated except that 1 p.p.m. Ucar C-149 polyelectrolyte was added at the same point in the process as in Example I. This water filtered quite well but again was inadequately clarified and decolorized, though perceptibly better than the filtered water of Example III.

Example V

An industrial waste water stream from a factory producing precision ground stainless steel parts was found to contain stably emulsified oil in excess of 1000 p.p.m. measured turbidimetrically. To a portion of this water was added 100 p.p.m. papermakers alum with rapid stirring. A heavy floc formed as the alum dissolved. The rate of agitation was reduced as earlier described, and 200 p.p.m. fast flow rate diatomaceous silicia filter aid added. A sample withdrawn again showed that there were separate floc and solid phases present. Next 1 p.p.m. of a alkylene polyamine polyfunctional halohydrin polymer available commercially as Nalco 600 was added and the floc was observed to have affixed itself to the filter aid after 5 minutes mild agitation. The resultant suspension was readily filtered in its entirety on a commercial filter and the filtered liquid was found to have less than 2.5 p.p.m. oil measured turbidimetrically and to be clear to the eye particularly as compared with the original orange-yellow opaque liquid.

Example VI

A portion of the liquid of Example V was mixed with 200 p.p.m. of finer diatomaceous silicia filter aid having a high degree of inherent clarifying ability. When filtered on a vacuum filter, not only were flow rates impractically slow but the filtered liquid still contained 125 p.p.m. oil measured turbidimetrically, which would be too much to permit disposal of the filtered water as waste.

Example VII

To another portion of the liquid of Example V was added 200 p.p.m. of a relatively finely divided diatomaceous silica filter aid having a high clarification index by the filter aid industry sugar test. After stirring 5 minutes to insure mixing the liquid was filtered with the same vacuum filter set-up used in the preceding example. Filtration rate was apparently similar to that of Example V but at least 100 p.p.m. of emulsified oil as determined turbidimetrically remained in the filtered liquid. This indicated that the commercial diatomaceous silica filter would not adequately clarify this material without some preconditioning as earlier described.

Example VIII

To another portion of the liquid of Example V was added 200 p.p.m. of a relatively porous diatomaceous silicia filter aid, the particles of which had been coated with 2 percent $Al(OH)_3$ in accordance with the procedure of my copending application Serial No. 118,276 mentioned above. After mixing for 10 minutes to allow contact between the coated filter aid and the emulsified oil particles, the whole liquid was filtered on a vacuum filter as in the preceding examples. Filtration rates were substantially better but at least 50 p.p.m. of the oil were estimated to remain in the filtered liquid, far exceeding the 10 p.p.m. maximum permissible limit.

Thus, of all the techniques tried on this liquid only that of the instant invention produced adequately clarified filtrate at practical filtration rates.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, maybe made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of removing impurities such as turbidity and color from water comprising first adding under rapid agitation between 10 and 40 p.p.m. each of filter aid particles and floc former, said floc former being selected from the group consisting of salts of a trivalent metal, salts of a tetravalent metal and mixtures thereof, forming floc particles therein, reducing the agitation to a low level but sufficient to maintain the filter aid and floc in suspension, then adding between 0.001 and 10.0 p.p.m. synthetic organic branch chain cationic polyelectrolyte to the slowly agitated suspension of the particles and causing the floc to become affixed to the filter aid particles, whereby the impurities are incorporated along with the floc, and thereafter passing the floc-affixed filter aid-containing water through a filter aid filter medium.

2. A method as defined in claim 1 wherein the water is passed into two successive retention areas for the two additions of ingredients.

3. A method as defined in claim 1 wherein the filter aid and floc former are each added in an amount between 20 and 200 p.p.m and the polyelectrolyte in an amount between 0.1 and 3 p.p.m.

4. A method as defined in claim 1 wherein the filter aid is selected from a group consisting of diatomaceous silica, perlite, and mixtures thereof.

5. A method as defined in claim 1 wherein the polyelectrolyte is selected from the group consisting of primary, secondary, and tertiary amines, quaternary ammonium, sulfonium salts and mixtures thereof.

6. A method as defined in claim 5 wherein the polyelectrolyte is a hydrophilic alkylene polyamine polyfunctional halohydrin polymer.

7. A method as defined in claim 5 wherein the polyelectrolyte is a sulfonium active group containing material.

References Cited by the Examiner

UNITED STATES PATENTS

| | | | |
|---|---|---|---|
| 2,236,930 | 4/1941 | Uytenbogaart. | |
| 2,468,189 | 4/1949 | Frankenhoff | 210—75 |
| 2,764,512 | 9/1956 | Wilson | 210—24 X |
| 2,941,942 | 6/1960 | Dahlstrom et al. | 210—53 |
| 2,995,512 | 8/1961 | Weidner et al. | 210—54 |
| 3,142,638 | 7/1964 | Blaisdell et al. | 210—54 X |

FOREIGN PATENTS

| | | |
|---|---|---|
| 607,440 | 10/1960 | Canada. |
| 826,770 | 1/1960 | Great Britain. |

OTHER REFERENCES

"Effectiveness of Water Treatment Processes in Virus Removal": Robeck et al., Jour. AWWA, Oct. 1962, vol. 54, pp. 1275–1292.

"Innovations in Water Clarification": Conley et al., Jour. AWWA, Oct. 1960, vol. 52, pp. 1319–1325.

MORRIS O. WOLK, *Primary Examiner.*

UNITED STATES PATENT OFFICE
CERTIFICATE OF CORRECTION

Patent No. 3,227,650 January 4, 1966

George R. Bell

It is hereby certified that error appears in the above numbered patent requiring correction and that the said Letters Patent should read as corrected below.

Column 8, line 12, for "maybe" read -- may be --; line 21, for "40 p.p.m." read -- 400 p.p.m. --.

Signed and sealed this 29th day of November 1966.

(SEAL)
Attest:

ERNEST W. SWIDER
Attesting Officer

EDWARD J. BRENNER
Commissioner of Patents